(12) United States Patent
Thambiratnam et al.

(10) Patent No.: US 9,483,557 B2
(45) Date of Patent: Nov. 1, 2016

(54) KEYWORD GENERATION FOR MEDIA CONTENT

(75) Inventors: Albert Joseph Kishan Thambiratnam, Beijing (CN); Sha Meng, Bellevue, WA (US); Gang Li, Beijing (CN); Frank Torsten Bernd Seide, Beijing (CN)

(73) Assignee: Microsoft Technology Licensing LLC, Redmond, WA (US)

( * ) Notice: Subject to any disclaimer, the term of this patent is extended or adjusted under 35 U.S.C. 154(b) by 85 days.

(21) Appl. No.: 13/040,640

(22) Filed: Mar. 4, 2011

(65) Prior Publication Data
US 2012/0226696 A1    Sep. 6, 2012

(51) Int. Cl.
*G06F 17/30* (2006.01)
(52) U.S. Cl.
CPC ... *G06F 17/30796* (2013.01); *G06F 17/30864* (2013.01)
(58) Field of Classification Search
CPC .................. G06F 17/30864; G06F 17/30675; G06F 17/30746
USPC ....................................................... 707/738
See application file for complete search history.

(56) References Cited

U.S. PATENT DOCUMENTS

| | | | |
|---|---|---|---|
| 7,739,116 B2 | 6/2010 | Miyamoto et al. | |
| 7,809,568 B2 | 10/2010 | Acero et al. | |
| 2003/0046263 A1* | 3/2003 | Castellanos et al. | 707/1 |
| 2006/0095420 A1* | 5/2006 | Ikegami | G06F 17/30867 |
| 2007/0005569 A1 | 1/2007 | Hurst-Hiller et al. | |
| 2007/0100803 A1* | 5/2007 | Cava | 707/3 |
| 2007/0112764 A1* | 5/2007 | Yih et al. | 707/5 |
| 2007/0198511 A1 | 8/2007 | Kim et al. | |
| 2007/0299815 A1* | 12/2007 | Starbuck et al. | 707/3 |
| 2008/0114721 A1* | 5/2008 | Jones et al. | 707/2 |
| 2008/0172422 A1* | 7/2008 | Li | G06Q 30/02 |
| 2009/0112844 A1* | 4/2009 | Oro | 707/5 |
| 2009/0150337 A1 | 6/2009 | Seide et al. | |
| 2011/0010173 A1* | 1/2011 | Scott | H04M 3/42221 704/235 |

OTHER PUBLICATIONS

Dowman, et al., "Web-Assisted Annotation, Semantic Indexing and Search of Television and Radio News", Proceedings of the 14th International World Wide Web Conference (WWW 2005), May 2005, pp. 225-234.
Hofmann, "Probabilistic Latent Semantic Analysis", Proceedings of the 15th Conference on Uncertainty in Artificial Intelligence (UAI '99), Jul. 30-Aug. 1, 1999, pp. 289-296.
Jin, et al., "Automatic Title Generation for Spoken Broadcast News", Proceedings of the 1st International Conference on Human Language Technology Research (HLT '01), Mar. 2001, 3 pages.

(Continued)

*Primary Examiner* — Alex Gofman
(74) *Attorney, Agent, or Firm* — Micky Minhas

(57) ABSTRACT

In various embodiments, a transcript that represents a media file is created. Keyword candidates that may represent topics and/or content associated with the media content are then be extracted from the transcript. Furthermore, a keyword set may be generated for the media content utilizing a mutual information criteria. In other embodiments, one or more queries may be generated based at least in part on the transcript, and a plurality of web documents may be retrieved based at least in part on the one or more queries. Additional keyword candidates may be extracted from each web document and then ranked. A subset of the keyword candidates may then be selected to form a keyword set associated with the media content.

14 Claims, 5 Drawing Sheets

(56) References Cited

OTHER PUBLICATIONS

Liu, et al., "Automatic Keyword Extraction for the Meeting Corpus Using Supervised Approach and Bigram Expansion", Proceedings of 2008 IEEE Workshop on Spoken Language Technology (SLT 2008), Dec. 2008, pp. 181-184.

Malaise, et al., "Relevance of ASR for the Automatic Generation of Keywords Suggestions for TV Programs", retrieved on Nov. 18, 2010 at <<http://eprints.eemcs.utwente.nl/16997/01/TALN_28.pdf>>, TALN 2009, Jun. 2009, 10 pages.

Meng, et al., "Vocabulary and Language Model Adaptation Using Just One Speech File", 2010 IEEE International Conference on Acoustics Speech and Signal Processing (ICASSP 2010), Mar. 2010, pp. 5410-5413.

Mihalcea, et al., "TextRank: Bringing Order Into Texts", Proceedings of the 2004 Conference on Empirical Methods in Natural Language Processing (EMNLP 2004), Jul. 2004, pp. 404-411.

Murray, et al., "Extractive Summarization of Meeting Recordings", Proceedings of the 9th European Conference on Speech Communication and Technology (EUROSPEECH 05), Sep. 2005, pp. 593-596.

Ohtsuki, et al., "Topic Extraction with Multiple Topic-Words in Broadcast-News Speech", Proceedings of the 1998 IEEE International Conference on Acoustics, Speech and Signal Processing, vol. 1, May 1998, pp. 329-332.

Papczun, "The SEO Impact of Google's New Speech Recognition in Videos", retrieved on Nov. 18, 2010 at <<http://searchengineland.com/google-audio-indexing-gaudi-and-seo-implications-14886>>, Oct. 9, 2008, 4 pages.

Riedhammer, et al., "Packing the Meeting Summarization Knapsack", 9th Annual Conference of the International Speech Communication Association (INTERSPEECH 2008), Sep. 2008, pp. 2434-2437.

Roth Weiss, "Adobe Speech Search", retrieved on Nov. 18, 2010 at <<http://library.creativecow.net/articles/weiss_roth_david/speech_search.php, 2009>>, 4 pages.

* cited by examiner

KEYWORD GENERATION FOR MEDIA CONTENT

BACKGROUND

With the amount of available media content increasing, users may desire to search for media content relating to various topics. Oftentimes, a user may locate media content, such as an audio file or a video file, but that media content may not include any corresponding description or metadata. That is, the identified media file may not include any information that describes or summarizes the actual content of the media file. As a result, the user may need to render the contents of the media file to determine whether the media file is relevant, which may take a significant amount of time. If the user intends to search multiple additional media files that also do not include associated descriptive information, sorting through the media files to determine which ones are of interest to the user may be inefficient and become inconvenient for the user.

SUMMARY

Described herein are techniques for generating keywords for media content. In various embodiments, a transcript that represents media content may be created or derived from that media content. Moreover, keyword candidates may be extracted from the transcript and ranked based at least in part on their respective relation to topics and/or content associated with the media content. A keyword set may then be generated from the list of ranked keyword candidates and associated with the media content.

In other embodiments, one or more web queries may be generated from a transcript corresponding to media content. A plurality of web documents may then be retrieved in response to submitting the one or more web queries to a search engine. Furthermore, keyword candidates may be extracted or parsed from each of the retrieved web documents. The keyword candidates may then be ranked and a subset of the keyword candidates may be selected to form a keyword set that represents topics and/or content relating to the media content.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
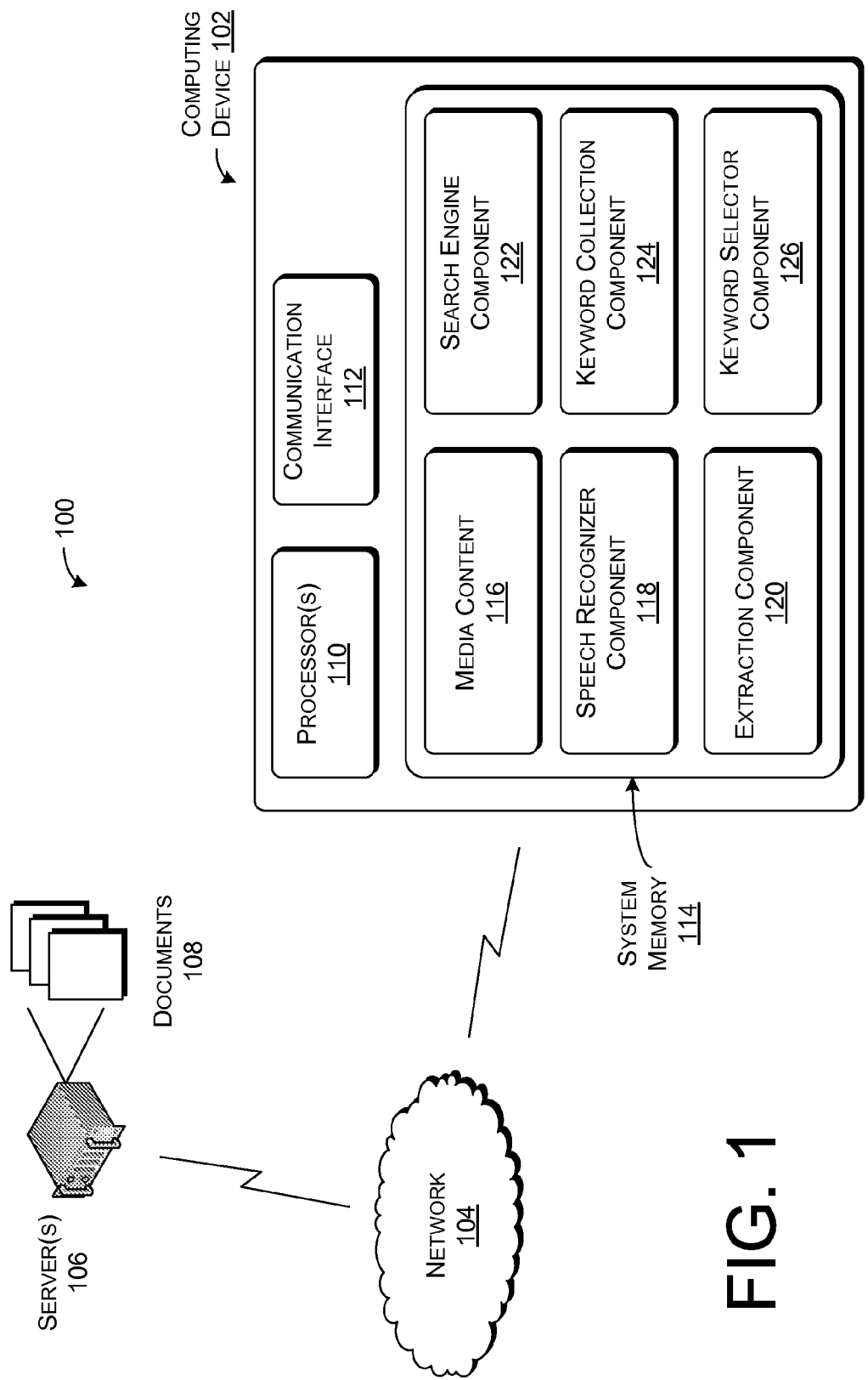
FIG. 1 illustrates a system for generating a keyword set for media content, in accordance with various embodiments.

Described herein are systems and/or techniques to generate indexable and browsable keyword metadata from transcripts derived from media content (i.e., such as by Automatic Speech Recognition (ASR)). A media file that does not include any associated information (i.e., metadata) that describes the contents of the media file may be inconvenient to a user. Instead of being able to determine the subject matter of the media file by accessing metadata associated with the media file, the user may be forced to render at least part of the media file to determine if it is relevant. Therefore, the user may need to spend extra time to determine if the media file is of interest to the user. If the user plans on sorting through multiple media files, the process of determining which media files are relevant and which files are not may become very inefficient and/or time-consuming.

For instance, assume that a user comes across a video file that does not have any metadata. When listed on a website or stored in a database, it may be difficult to determine the topic of this video file without actually watching it. Furthermore, because this video file may not be easily indexed by text indexers and/or search engines, this video file may not be grouped or listed with other topically-similar video files in response to a search. However, even if a retrieval system is able to list this video file in a set of search results, there still may be no metadata to present to the user. Consequently, the user may again be forced to watch the video in order to decide if it is relevant. A user may be faced with a similar situation when browsing audio or video files that are archived in a database (i.e., legislative hearings). In response to a search for an audio file, for example, the database may present a list of audio files to the user. If these audio files do not include a title or other information describing their contents, the user may be forced to listen to portions of each audio file to determine whether they are responsive and/or relevant to the previously submitted search.

Therefore, it may be helpful to identify and associate keywords with a media file in order to improve discoverability and/or browsing of media files. In various embodiments, a transcript corresponding to a particular media file may be generated by any type of speech recognition techniques, such as ASR, for example. A set of keywords may then be created from the transcript. Moreover, a particular keyword set, which may be a subset of the set of keywords, may be generated based at least in part on a mutual information criteria. In various embodiments, the mutual information criteria may relate to the act of measuring the mutual dependence of two or more variables. Therefore, the keywords in the keyword set may represent the topics and/or subject matter of the media file. For the purposes of this discussion, media content or media file may be used interchangeably and may correspond to an audio file, a video file, or any other type of content.

In other embodiments, described herein are techniques for generating keyword metadata from text transcripts by leveraging the Web. More particularly, a set of web queries may be generated from a transcript (e.g., an ASR transcript) of a particular media file. In response to receiving these web queries, a search engine may identify one or more web documents responsive and/or relevant to each web query. That is, the web queries may be used to retrieve similar text from the web. Based on the keywords associated with each of the retrieved web documents, a set of candidate keywords may then be created and ranked. Subsequently, a keyword set that represents topics and/or subject matter associated with the media file may be generated and/or displayed to the user along with the media file.

Various examples of keyword generation techniques, in accordance with the embodiments, are described below with reference to FIGS. 1-5.

FIG. 1 illustrates a system 100 for generating a keyword set associated with media content. More particularly, the system 100 includes a computing device 102, a network 104, one or more server(s) 106, and documents 108 associated with the server(s) 106. In various embodiments, the computing device 102 includes one or more processor(s) 110, a communication interface 112, and system memory 114. Moreover, the system memory may include media content 116, a speech recognizer component 118, an extraction component 120, a search engine component 122, a keyword collection component 124, and a keyword selector component 126.

In some embodiments, the network 104 may be any type of network known in the art, such as the Internet. Moreover, the computing device 102 may be communicatively coupled to the network 104 in any manner, such as by wired or wireless connections. Further, the server(s) 106 may be any type of server known in the art, such as a web server. The server(s) 106 may store one or more of the documents 108, which may include documents accessible via the Internet. As shown in FIG. 1, the computing device 102 may access the server(s) 106 and the corresponding documents 108 by way of the network 104.

The techniques and mechanisms described herein may be implemented by multiple instances of the computing device 102 as well as by any other computing device, system, and/or environment. The computing device 102 shown in FIG. 1 is only one example of a computing device and is not intended to suggest any limitation as to the scope of use or functionality of any computing device utilized to perform the processes and/or procedures described above.

In at least one configuration, the processor(s) 110 may execute one or more modules and/or processes to cause the computing device 102 to perform a variety of functions. In some embodiments, the processor(s) 110 are a CPU, a GPU, both CPU and GPU, or other processing units or components known in the art. Additionally, each of the processor(s) 110 may possess its own local memory, which also may store program modules, program data, and/or one or more operating systems.

In various embodiments, the communication interface 112 may allow the computing device 102 to communicate and/or interface with the network 114 and/or one or more devices, such as the server(s) 106. Moreover, the communication interface 112 may be any type of communication interface known in the art.

Depending on the exact configuration and type of the computing device 102, the system memory 114 may be volatile (such as RAM), non-volatile (such as ROM, flash memory, miniature hard drive, memory card, or the like) or some combination thereof. The system memory 114 may include an operating system, one or more program modules, and may include program data.

As mentioned previously, the system memory 114 may include the media content 116, the speech recognizer component 118, the extraction component 120, the search engine component 122, the keyword collection component 124, and the keyword selector component 126. It is appreciated that the system memory 114 may include components in addition to the foregoing components. Moreover, although FIG. 1 illustrates that these components are included within the system memory 114, it is contemplated that any one or some of the media content 116, the speech recognizer component 118, the extraction component 120, the search engine component 122, the keyword collection component 124, and the keyword selector component 126 may be stored on a different or remote device, such as the server(s) 106. The foregoing components will be described in detail with respect to FIGS. 1-4.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 114, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 110, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 102 may also have input device(s) such as a keyboard, a mouse, a pen, a voice input device, a touch input device, etc. Output device(s), such as a display, speakers, a printer, etc. may also be included. A user may utilize the foregoing features to interact with the computing device 102, the network 104, and/or the server(s) 106. For instance, the computing device 102 may be used to access the Internet or one or more databases and be used to enter one or more terms and/or queries into a web search engine.

It is appreciated that the illustrated computing device 102 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Figure 2:
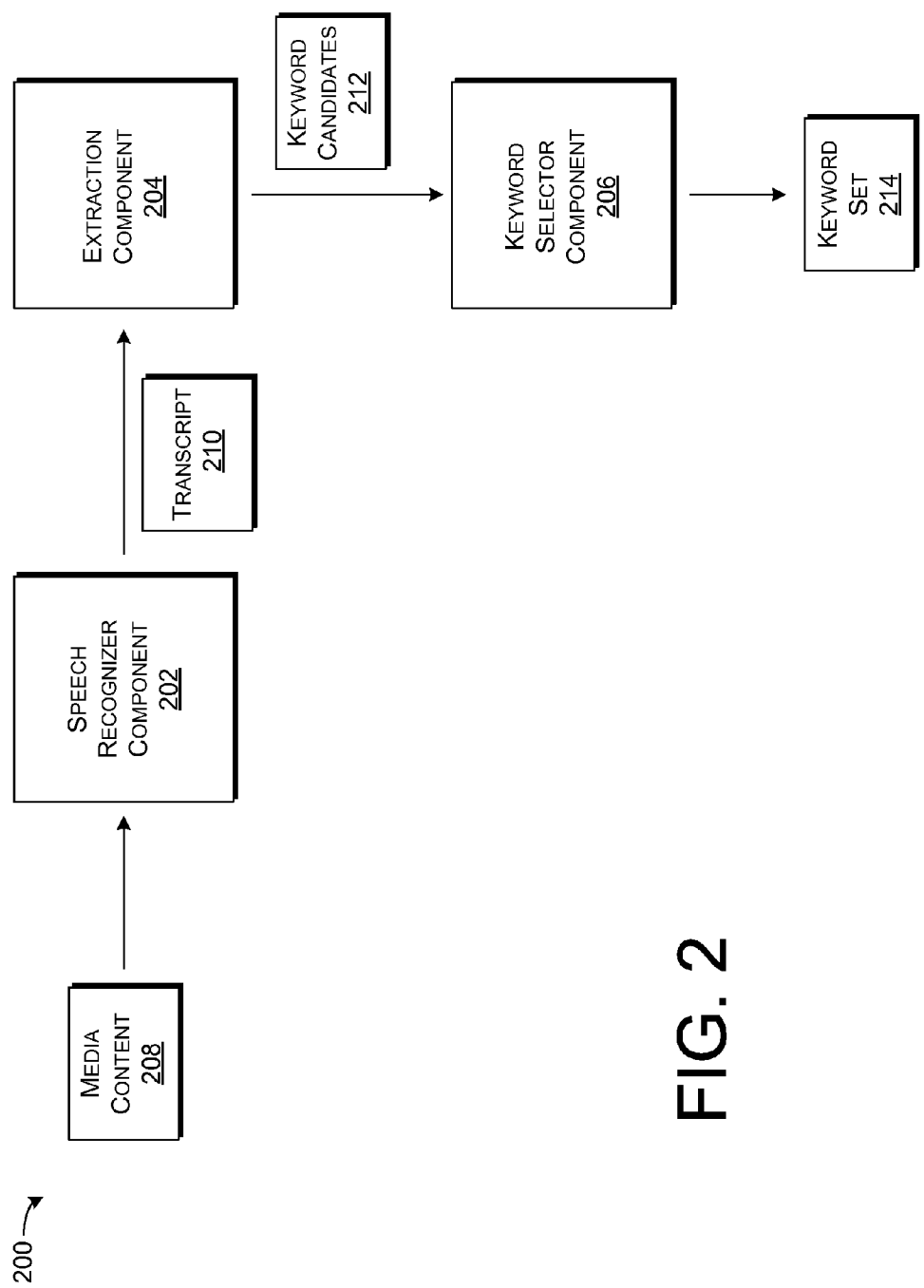
FIG. 2 is a flow diagram between components of a system that illustrates generating a keyword set for media content, in accordance with various embodiments.

FIG. 2 illustrates a flow diagram 200 between components of a system for generating a keyword set associated with media content. More particularly, the components of the flow diagram 200 include a speech recognizer component 202, an extraction component 204, and a keyword selector component 206. Furthermore, the flow diagram 200 may further include media content 208, a transcript 210, keyword candidates 212, and a keyword set 214.

In various embodiments, the media content 208 may include any type of media content, such as an audio file or a video file, for example, and may also be referred to as a media file. Further, the media content 208 may or may not correspond to media content 116, as illustrated in FIG. 1. Moreover, in some embodiments, the media content 208 may be without any information (i.e., text, images, etc.) that describes the contents of the media content 208. That is, the media content 208 may include little, if any, metadata or other information that lists or describes topics and/or subject matter relating to the media content 208. For instance, assuming the media content 208 was a college football game, keywords and/or information about the media content 208 could include the terms "football," "college," and/or the names of the teams, players, and/or coaches participating in the football game. Without such information (i.e., metadata, keywords, etc.), it may be difficult for a user to specifically determine the subject matter of the media content 208.

In example embodiments, the media content 208 may be processed by the speech recognizer component 202. In various embodiments, the speech recognizer component 202 may or may not correspond to speech recognizer component 118, as shown in FIG. 1. The speech recognizer component 202 may convert speech and/or non-speech included in the media content 208 into the transcript 210 using any speech recognition techniques known in the art. For instance, the speech recognizer component 202 may, based on the speech and/or non-speech included in the media content 208, generate the transcript 210 utilizing ASR. The transcript 210 may include text that represents content (i.e., speech, non-speech, other noise, etc.) included in the media content 208. For instance, using the example above, if a video file related to a college football game, the transcript 210 may include text corresponding to speech by the individual commentators of the game. In additional embodiments, the speech recognizer component may also be used to extract words from text, such as text included within a word processing document.

In various embodiments, once the transcript 210 has been generated by the speech recognizer component 202, the extraction component 204 may generate the keyword candidates 212. The extraction component 120 may or may not correspond to extraction component 120, as shown in FIG. 1. The keyword candidates 212 may include a list of words and/or phrases that are included in the text transcript 210 and/or words and/or phrases that relate to the media content 208. Therefore, the word(s) that make up the keyword candidates 212 may represent topics or other subject matter that relate to the media content 208. Using the example above, words included in the keyword candidates 212 may include "football," "college," and/or the names of teams, players, and/or coaches participating in the football game. In some embodiments, the keyword candidates 212 may represent a comprehensive list of words that could be selected as keywords for the media content 208. More particularly, the keyword candidates 212 may include a distinct list of words in the transcript 210 that excludes stop words.

Furthermore, the keyword selector component 206 may generate the keyword set 214 from the keyword candidates 212. In some embodiments, the keyword selector component 206 may or may not correspond to keyword selector component 126, as shown in FIG. 1. Moreover, the keyword set 214 may include keywords that most accurately represent topics and/or content associated with the media content 208. That is, the keyword selector component 206 may leverage the transcript 210 and the keyword candidates 212 for keyword generation. Prior to generating the keyword set 214, the keyword selector component may rank each of the keyword candidates 212 based at least in part on their respective relevance to the original media content 208. In other words, keywords included in the keyword candidates 212 that more accurately represent topics associated with, and/or content included in, the media content 208 may be ranked higher than keywords that are less representative of the media content 208. An example process for ranking the keywords included in the keywords candidates 212 is described in additional detail below.

Once the keywords included in the keywords set 212 are ranked, the keyword selector component 206 may select a predetermined amount of keyword candidates 212 to be included in the keyword set 214. It is contemplated that any number of keywords may be included in the keyword set 214. Moreover, in other embodiments, keywords in the keyword candidates 212 that are either above or below a certain threshold may be included in the keyword set 214. This threshold may relate to a relatedness of the keywords candidates 212 to the media content 208.

A user may utilize the keyword set 214 to gain information about the media content 208 without needing to actually view or listen to the media content 208. For instance, using the previous example, a user may be presented with a link or file associated with media content 208. However, the media content 208 may include a variety of keywords, such as the keyword set 214, that describe the subject matter, topics, and/or contents of the media content 208. In this example, the keyword set 214 may indicate that the media content 208 is a college football game and may further identify the date of the game, the outcome, and the teams, players, and/or coaches who participated in the game. Therefore, by viewing this information before rendering the media content 208, a user may learn enough information to determine whether the media content 208 is relevant. Otherwise, if the media content 208 did not include these keywords, the user may be forced to render the media content 208 in order to determine whether the media content 208 is of interest to the user. Rendering media content 208 that is determined to be irrelevant may be deemed a waste of time. Moreover, rendering one or multiple media files may take significant time and, therefore, may be inconvenient and/or frustrating to the user.

Accordingly, the keyword set 214 may allow a user to infer an approximate topic of a particular media file even when the list of keywords included in the keyword set 214 is fuzzy and/or imprecise. Moreover, users may be more tolerant of errors in keyword sets 214 as compared to text summaries of the media content 208 since the keyword set 214 need only contain a list of keywords. On the contrary, if a summary of the media content 208 was incoherent and/or did not flow properly, the summary may not adequately convey the subject matter of the media content 208. Furthermore, the keyword set 214 may be associated with the media content 208 so that the media content is indexable and/or searchable by databases and/or search engines.

In some embodiments, the keyword candidates 212 may be ranked and/or the keyword set 214 may be generated by utilizing a mutual information criteria. More particularly, given a keyword set Θ, and a document set represented by the word set X, an unnormalized mutual information I'(Θ;X) may reflect the information known about X given Θ. Intuitively, the best (i.e., most accurate) keyword set 214 may be the one that maximizes the mutual information. Therefore, the keyword selection task, which may be performed by the keyword selector component 206, may be expressed as search operation to determine the optimal set Θ*, as illustrated in Equation 1:

$$\Theta^* = \operatorname*{argmax}_{\Theta} I'(\Theta; X) \qquad (1)$$

When considering the superset Θ⁺, which may represent an exhaustive set of all the keywords, the mutual information may be represented by the following, as shown in Equations 2 and 3:

$$I'(\Theta^+; X) = \sum_{\theta \in \Theta^+} \sum_{x \in X} p(\theta)p(x|\theta)\log\frac{p(\theta, x)}{p(\theta)p(x)} \qquad (2)$$

$$p(\theta, x) = N(\theta, x)/N_X \qquad (3)$$

In this embodiment, p(Θ,x) may represent the co-occurrence of keyword Θ and word x. Moreover, p(Θ,x) may be computed from N(Θ,x), or the number of documents that contain both Θ and x, and $N_x$, or the total number of documents. The marginal probability p(x)=$\Sigma_\Theta$p(θ,x) may be the probability of x co-occurring with any keyword candidate and may be distinct from the term frequency probability of x.

In various embodiments, Equation 2 may be rewritten as shown in Equations 4 and 5:

$$I'(\Theta^+; X) = \sum_{\theta \in \Theta^+} p(\theta)I'(\theta; X) \qquad (4)$$

$$\text{where } I'(\theta; X) = \sum_{x \in X} p(x|\theta)\log\frac{p(\theta, x)}{p(\theta)p(x)} \qquad (5)$$

In various embodiments, each term inside the summation in Equation 4 may be independent of the other Θ. Moreover, given a desired keyword set size, G, Equation 1 may be solved by ranking Θ by p(Θ)I'(Θ;X) and choosing the G highest scoring Θ. Furthermore, Equation 4 may be used as a normalizing term since it may represent the maximum achievable mutual information. Accordingly, the usefulness of keyword Θ for describing document set X may be represented by Equation 6:

$$I(\theta; X) = \frac{p(\theta)I'(\theta; X)}{\sum_{\theta'} p(\theta')I'(\theta'; X)} \qquad (6)$$

As shown, a highly accurate keyword set of size G may be constructed by finding the G highest ranked Θ according to Equation 6.

In other embodiments, phrases may be more specific and informative than single words and, therefore, may be more desirable to include in a keyword set. Using the example described above, it may be more informative to include phrases when describing a college football game. For instance, it may be more informative to include the phrase "Washington versus Oregon," which may indicate some type of competition, rather than single words such as "Washington" and "Oregon," which may indicate any information relating to the states of Washington and Oregon. In this case, a user who views the keywords associated with the media content 208 would likely then know which two teams participated in the football game.

In various embodiments, the foregoing equations may be applied to phrases as opposed to just single words. Initially, Θ⁺ may be allowed to include phrases, the document set represented by X may be tokenized using a part-of-speech tagger, and phrase boundaries may be maintained. Keyword selection may then proceed as described above. In the above embodiments, in order to avoid obtaining a sparse p(Θ,x), X may be modified to keep phrases that occurred in Θ⁺ and any other phrases may be broken into single words.

In different embodiments, importance of the keywords within the keyword candidates 212 may be computed for each single keyword according to Equation 6. For the purposes of this discussion, importance may refer to the relevance and/or accuracy of a keyword and/or a phrase with respect to the media content 208. Furthermore, phrase importance may be computed as the average of its constituent single word importances, which is shown as Equation 7:

$$I(\theta; X) = \frac{1}{N_w}\sum_{w \in \theta} I(w; X), \qquad (7)$$

where $N_w$ may represent the number of words in Θ. Therefore, a phrase score may not be higher than its highest scoring (i.e., ranking) single word constituent, but it may also out-rank some of its lower scoring single words. Accordingly, this may affect the ranking of phrases but not the choice of phrases included in Θ⁺.

In further embodiments, the mutual information criteria may also be used for keyword extraction. Extraction may denote only considering words in the input text (e.g., transcript 210) as keyword candidates 212 and the keyword extraction may be performed by the extraction component 204, as shown in FIG. 2. More particularly, the candidate set (i.e., the keyword candidates 212) Θ⁺ may be constructed by selecting noun phrases in the input text. In various embodiments, Θ⁺ may be constructed by selecting all noun phrases in the input text. Further, a stop word list may be used to prune common or duplicative words and the document set X may be created by paragraph breaking or sentence breaking text and considering each break unit as a document. Phrase importance may then be used to rank and select the keywords that most accurately represent the media content 208.

As described above, a keyword set 214 may be generated that includes keywords and/or phrases that are most relevant to and/or most accurately represent the media content 208. In various embodiments, the keyword set 214 may be displayed to a user along with the media content 208 itself. In different embodiments, the keyword set 214 may be presented to the user in response to some user actuation. As a result, the user may be able to ascertain the topic and/or subject matter of the media content 208 by viewing the associated keyword set 214 and without actually rendering the media content 208. That is, the user may determine the relevance of the media content 208 without spending additional time to render (i.e., view, listen to, etc.) the media content 208. Including the keyword set 214 along with the media content 214 may allow the user to more efficiently search and sort content that is of interest to the user. In addition, since the media content 208 may include descriptive information relating thereto, the media content 208 may be both indexable and searchable.

Figure 3:
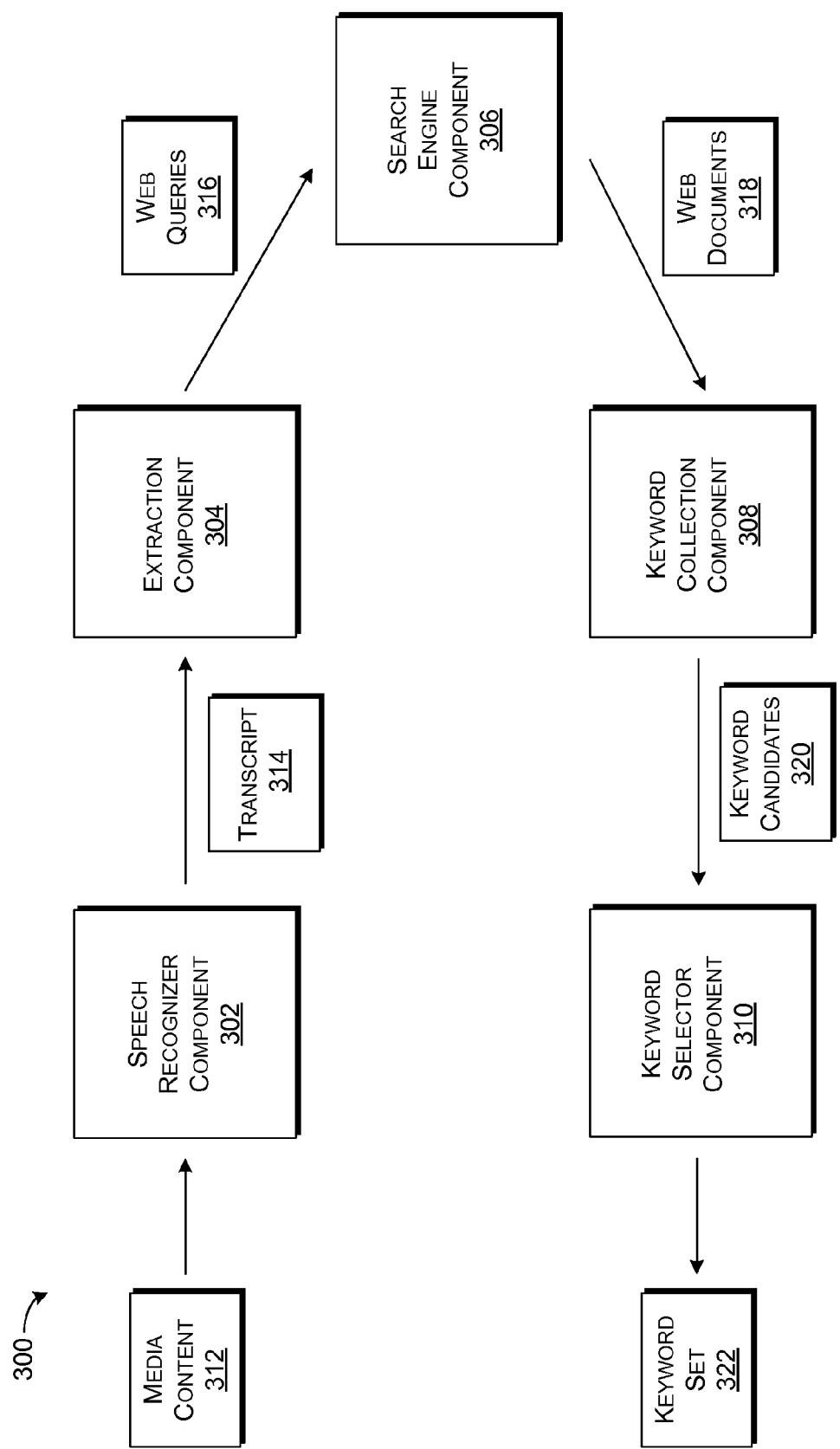
FIG. 3 is a flow diagram between components of a system that illustrates generating a keyword set for media content based at least in part on keywords extracted from web documents, in accordance with various embodiments.

FIG. 3 shows a flow diagram 300 between components of a system for generating a keyword set by leveraging sources in addition to an ASR transcript. As shown, the components of the system include a speech recognizer component 302, an extraction component 304, a search engine component 306, a keyword collection component 308, and a keyword selection component 310. In addition, the flow diagram may also include media content 312, a transcript 314, web queries 316, web documents 318, keyword candidates 320, and a keyword set 322. For the purposes of this discussion, the media content 312 may or may not correspond to media content 116 and/or 208 and the speech recognizer component 302 may or may not correspond to speech recognizer component 118 and/or 202.

In various embodiments, the keyword set 322 associated with a particular media content 312 may be determined by leveraging databases and/or information retrieved from the Internet (i.e., the Web). Web pages typically include manually generated keyword lists in their meta information (i.e., metadata) that serve as hints for search engine indexers. In various embodiments, these manually generated keyword lists may be used as a constraint for the keywords that may be generated for the media content 312.

In particular, the speech recognizer component 302 may convert the media content 312 into the transcript 314. For the purposes of this discussion, the media content 312 may refer to an audio file, a video file, or any other type of media content and the transcript 314 may or may not correspond to transcript 210, as illustrated in FIG. 2. Moreover, the speech recognizer component 302 may generate the transcript 314 using any speech recognition technique known in the art, such as ASR, for example. The transcript 314 may include text that represents speech and/or non-speech included in the media content 312. Consequently, the transcript 314 may constitute a textual version of the media content 312.

In other embodiments, the extraction component 304 may extract one or more web queries 316 from the transcript 314. The extraction component 304 may or may not refer to extraction component 120 and/or extraction component 204, as shown in FIGS. 1 and 2, respectively. Moreover, the web queries 316 may include any words and/or phrases that are identified in the transcript 314 or that are similar to terms found in the transcript 314. In some embodiments, the web queries 314 may include words and/or phrases that are more commonly found in the transcript 314, which may mean that these words and/or phrases were spoken more frequently in the media content 312. More particularly, the extraction component 304 may break down the transcript 314 based on long silence to obtain sentence-like units to give a sentence-broken ASR word set A. Moreover, noun phrases may be extracted per sentence using a part-of-speech tagger to give the unique noun phrases set $\Theta_A^+$. The web queries 316 may then be formed by combining the noun phrases in the same sentence unit. For example, the query <"speech recognition" "difficult problem"> may be generated for the sentence "speech recognition is a difficult problem." In various embodiments, each web query 316 may correspond to one or more terms that are found in the transcript 314 or one or more terms that are similar to terms found in the transcript 314.

Once the web queries 316 are identified, the web queries 316 may then be pruned, meaning that terms within a particular web query 316 may be removed. More particularly, a probability, such as a posterior probability, may be computed for terms included in the transcript 314. In one embodiment, the posterior probability may be computed for each word included in the transcript 314. A word may be removed from a web query 316 if its confidence is below a confidence threshold τ. One or more words may be removed from the above web query 316 in order to mitigate the effects of speech recognition errors. Subsequently, noun phrases in $\Theta_A^+$ may be ranked by $I(\Theta;A)$ and a phrase may be removed from a web query 316 if its importance is less than 1/J (the value of Equation 6 if all keywords have equal importance), where J may refer to the number of unique words in A.

As a result of the above pruning operations, duplicate and/or empty web queries 316 may remain. That is, since words have been removed from various web queries 316, the newly formed pruned web queries 316 may be similar, if not identical, to the web queries 316 that have yet to be pruned. Any duplicate and/or empty web queries 316 may be removed and the query importance (i.e., ranking) for each pruned web query 316 may be computed utilizing Equation 6. The remaining pruned web queries 316 may then be sorted according to importance and the top M pruned web queries 316 may be selected, where it is contemplated that M may be any number.

In further embodiments, the web queries 316 generated from the transcript 314 may be submitted to a search engine, such as the search engine component 306 and/or search engine component 122. Each web query 316 may be executed by the search engine component 306 individually such that results are generated for each web query 316. That is, a first set of web documents 318 may be retrieved based on a first web query 316, a second set of web documents 318 may be retrieved based on a second web query 316, and so on. In response to submitting each web query 316 to the search engine component 306, the search engine component 306 may identify and retrieve websites and/or URLs that are relevant and/or responsive to each web query 316. The results associated with each web query 316 may then be collected and accumulated to form a set of web documents 318. The web documents 318 may represent information retrieved from the web that is relevant and/or responsive to the web queries 316.

As mentioned previously, keywords are frequently identified and associated with various webpages. That is, these webpages may have already been marked with keywords that summarize content that is described therein. As a result, in response to a search engine receiving a web query 316, the search engine may identify relevant webpages based at least in part on their associated keywords and index the webpages appropriately. In other words, the search engine may retrieve and return webpages that have corresponding keywords that are similar in subject matter to the web query 316. Therefore, by submitting the web queries 316 to the search engine component 306, the transcript 314 may be indirectly compared to text and other information available via the Internet. Furthermore, websites that are topically similar and/or have associated keywords that are similar to the submitted web queries 316 may be retrieved. In various embodiments, these websites may constitute the web documents 318.

In example embodiments, after the web queries 316 are submitted to the search engine component 306, a predetermined number (i.e., 10, 50, 100, etc.) of web documents 318 may be downloaded per query result. The HTML body text may be extracted from each web document 318 based on text normalization (i.e., removing HTML tags and objects, sentence breaking, etc.). As a result, clean web documents 318 may be obtained.

Moreover, as shown in FIG. 3, the keyword collection component 308 may analyze the web documents 318 to generate a set of keyword candidates 320 and also may or may not correspond to keyword collection component 124, as shown in FIG. 1. More particularly, the keyword collection component 308 may identify words in the body of the web documents 318 that are shared by other web documents 318. The keyword collection component 308 may also identify common words found in the keywords associated with the web documents 318. Once words common to multiple of the web documents 318 are identified, the keyword collection component may designate the most commonly found keywords as the keyword candidates 320. That is, once the system identifies a certain number (X) of web documents 318 that are highly similar to the transcript 314, the system may look for agreement between words and/or keywords associated with the web documents 318. If a particular keyword is shared by many of the web documents 318, there may be a greater likelihood that this keyword accurately describes and/or represents the content included in the transcript 314.

Alternatively, the keyword candidates 320 may include a group of keywords that relate to the transcript 314 derived from the media content 312. In various embodiments, keyword meta information may be parsed or extracted from the HTML header of each web document 318. The keyword meta information from the HTML header may include one or more keywords that describe or relate to each web document 318. In various embodiments, the keywords included in the HTML header may be explicitly typed by a web page author to assist in the discoverability of each web document 318 by one or more search engines. For instance, these manually-generated keywords may be inputted to specify page description, keywords relating to the content of the web document 318, the author of the web document 118, the date the web document 318 was last modified, and/or other metadata relating to the web document 318. Therefore, the manually-generated keywords included within the HTML header of the web document 318 may be leveraged by the keyword collection component 308 to form the keyword candidates 320.

That is, the meta information included in the HTML header of each web document 318 may be parsed and included in the keyword candidates 320. In other embodiments, the meta information described above may be extracted from the HTML header, meaning that the meta information may be extracted using automatic techniques for mining and extracting keywords.

Once the meta information has been parsed from the HTML header of each web document 318, the unique set of keywords for each web document 318 may then be sorted according to document frequency, which may correspond to the number of web documents 318 in which the keyword occurred in the meta information. That is, keywords that are found more frequently in either the meta information or the body of the web documents 318 may be ranked higher than keywords that appear less frequently. Moreover, common words from a stop word list may also be removed.

Based on the keywords identified in the web documents 318, the set of keyword candidates 320 may be built and the keywords included in the set of keyword candidates 320 may be ranked, as described above. It is contemplated that the keywords may be ranked using any technique known in the art. Furthermore, in order to constrain computation and memory requirements of the system, a predetermined number of ranked keywords may be selected for the set of keyword candidates 320. More particularly, a specific number of top ranked keywords may be selected and designated as the set of keyword candidates $\Theta_B^+$.

In various embodiments, the keyword selector component 310 may generate the keyword set 322 based at least in part on the set of keyword candidates 320. Furthermore, the keyword selector component 310 may or may not correspond to keyword selector component 126 and/or keyword selector component 206, as illustrated in FIGS. 1 and 2, respectively. In particular, a mutual information criteria may be used to rank and select keywords from the set of keyword candidates 320 that most accurately represent the media content 312 and/or the transcript 314. Moreover, the keyword set 322 may be generated using the mutual information criteria described in additional detail above with respect to FIG. 2.

Furthermore, since the keywords that make up the keyword set 322 may be extracted from meta information associated with the web documents 318, and these keywords may have been associated with the web documents 318 by one or more persons that manage the web documents 318, the keyword set 322 may include human-specified words. Moreover, these human-specified words presumably represent topics and/or subject matter relating to the web documents 318. Therefore, because the web documents 318 were identified based at least in part on their similarity to the transcript 314 and in particular, the web queries 316, the keywords included in the keyword set 322 are likely to represent topics and/or content associated with the media content 312 and the transcript 314. Additionally, since at least some of the keywords included in the keyword set 322 may be derived from the web documents 318, the keyword set 322 may also include keywords in addition to those identified in the transcript 314 itself.

In various embodiments, the importance (i.e., relevance) of each keyword candidate 320 $\theta \in \Theta_B^+$ may be computed in a variety of ways. First, the importance may be computed with respect to the sentence-broken transcript 314 set A→I ($\Theta$;A). This may be analogous to the keyword extraction method described above with respect to FIG. 1 (i.e., Equation 7) but the keyword candidate 320 list may be constrained to the intersection of $\Theta_B^+$ and the vocabulary of the transcript 314. In another embodiment, keyword importance may be computed with respect to the web document 318 set B→I($\Theta$;B), which may be an indirect comparison to the transcript 314 since the documents in B may only be loosely related to A. Computing importance in this manner may enable keyword generation since the final keyword set 322 may be the union and/or intersection of $\Theta_B^+$ and the web text vocabulary, which may be considerably larger than the vocabulary of the transcript 314. Moreover, combining these scores may provide a balance between keyword generation capabilities and relatedness to the transcript 314. A final importance score may be given by weighted normalized linear interpolation, as shown in Equation 8:

$$I(\theta; A, B) = \alpha \frac{I(\theta; A) - \mu_A}{\sigma_A} + (1 - \alpha) \frac{I(\theta; B) - \mu_B}{\sigma_B}, \quad (8)$$

where $\mu_A$, $\mu_B$, $\sigma_A$, and $\sigma_B$ may represent the means and standard deviations of $I(\Theta;A)$ and $I(\Theta;B)$, respectively, estimated from the ranked keyword set 322.

Therefore, the system automatically generates keywords for a media file from the transcript 314 by leveraging the web. More particularly, web queries 316 may be generated from the transcript 314 and used to retrieve similar text from the web. The keyword meta information (i.e., keywords) embedded in web documents 318 retrieved in response to the web queries 316 may be ranked using a mutual information criteria to derive the keyword set 322. The foregoing technique may be conducted without training, may allow for both keyword and phrase keyword generation, and may generate keywords that are not included in the media content 312 or the corresponding transcript 314, which may alleviate the impact of ASR out-of-vocabulary.

Therefore, the keyword set 322 may accurately represent topics and/or content associated with a media file. When the keywords included within the keyword set 322 are associated with the media file, users who come across the media file may be able to determine information about the media file based at least in part on the keywords, and without needing to actually render the media file. As a result, a user may search and sort through a plurality of media files without having to spend additional time watching or listening to the media file to determine its corresponding subject matter. Accordingly, including these keywords with the media file may increase efficiency by assisting the user in identifying which media files are and are not of interest to the user.

Figure 4:
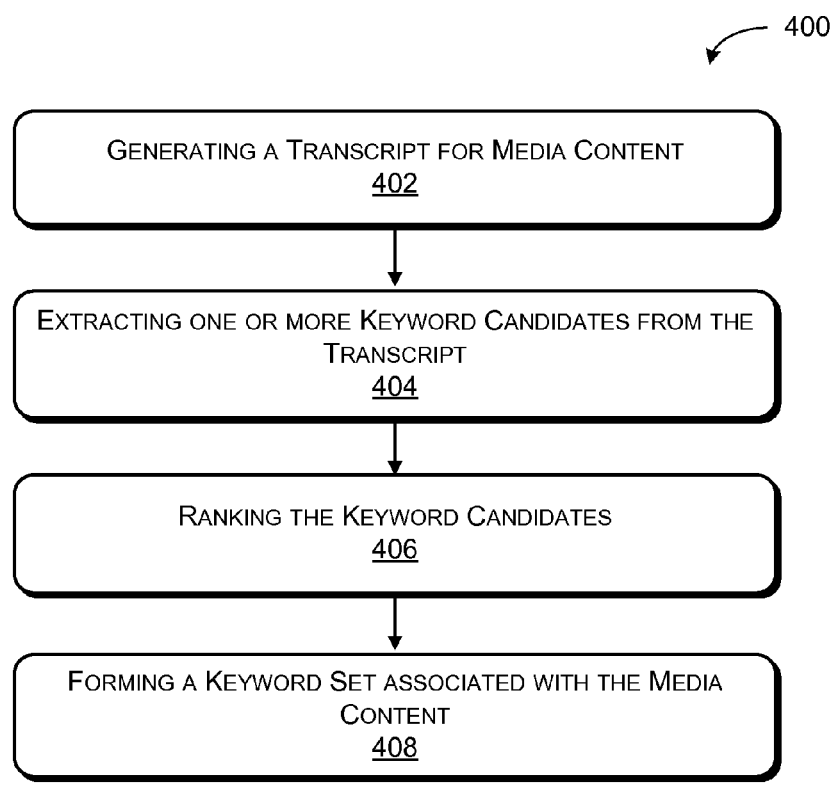
FIG. 4 is a flowchart of an illustrative process to generate a keyword set for media content.
Figure 5:
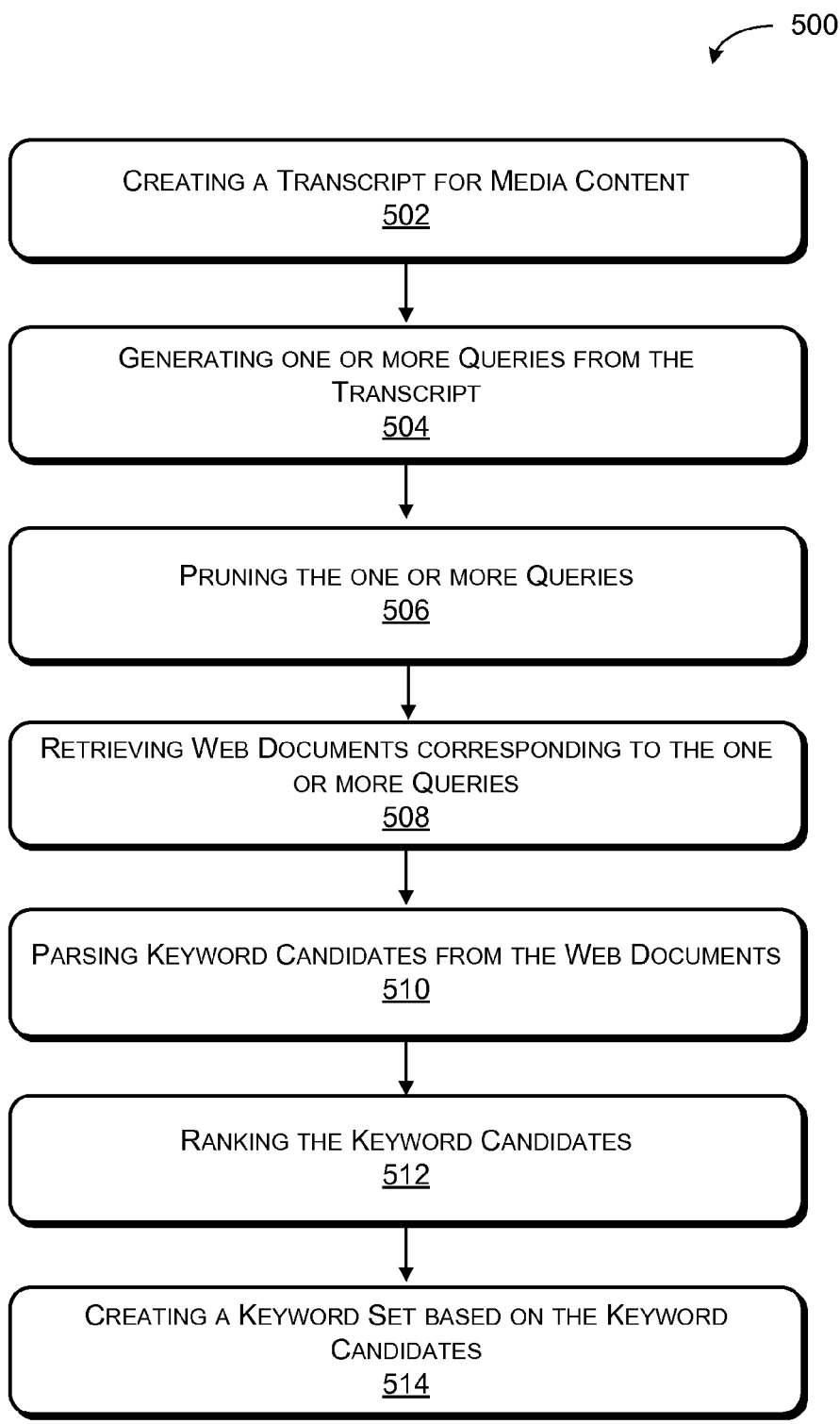
FIG. 5 is a flowchart of an illustrative process to generate a keyword set for media content based at least in part on keywords extracted from web documents.

FIGS. 4 and 5 illustrate various example processes for generating a keyword set that represents topics associated with a particular media file. The example processes are described in the context of the systems of FIGS. 1-3, but are not limited to those environments. The order in which the operations are described in each example process is not intended to be construed as a limitation, and any number of the described blocks can be combined in any order and/or in parallel to implement each process. Moreover, the blocks in the FIGS. 4 and 5 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flowchart illustrating a process 400 of generating a keyword set based on media content, such as a media file. More particularly, block 402 illustrates generating a transcript for media content. In various embodiments, the generating may be performed by speech recognizer component 118 and/or speech recognizer component 202. Furthermore, the media content may correspond to media content 116 and/or media content 208 and the transcript may correspond to transcript 210, as shown in FIGS. 1 and 2. As mentioned previously, the media content may be a media file and may include any type of media content, such as audio content or video content, for example. Moreover, the media content may include speech non-speech, and/or other noise, which may be converted into a text transcript. Further still, the media content may be without any associated keywords that describe topics and/or content relating to the media content. Therefore, a user who identified this media content may need to render its contents to determine if it is relevant and/or of interest to the user. Further, the transcript may be generated utilizing any speech recognition techniques known in the art (e.g., ASR) and it may represent verbal communications included in the media content.

Block 404 illustrates extracting one or more keyword candidates from the transcript. In some embodiments, the keyword candidates may correspond to keyword candidates 212 and the extracting may be performed by extraction component 120 and/or extraction component 204, as illustrated in FIGS. 1 and 2. Moreover, and as stated above, the transcript may represent content included in the media content. The keyword candidates may include words and/or phrases that are included in the transcript. Further, the keyword candidates may include words and/or phrases that are similar, but not identical, to words and/or phrases included in the transcript. As a result, the keyword candidates may also include words and/or phrases that describe topics and/or content included in the media content. The keyword candidates also may represent words and/or phrases that may be identified as keywords for the media content.

Block 406 illustrates ranking the keyword candidates. In various embodiments, the ranking may be performed by keyword selector component 126 and/or keyword selector component 206, as shown in FIGS. 1 and 2, respectively. More particularly, the keywords candidates may be ranked utilizing a mutual information criteria or by any other means known in the art. The keyword candidates may also be ranked based on how accurately they represent topics and/or content included in the media content. For instance, one or more candidate keywords that represent the primary topic of the media content may be ranked higher than a candidate keyword that relates to a more minor topic that is discussed briefly in the media content.

Block 408 illustrates forming a keyword set associated with the media content. In some embodiments, the keyword set may correspond to keyword set 214 and the forming may be performed by keyword selector component 126 and/or keyword selector component 206. The keyword set may be formed based on the ranking of the keyword candidates such that a particular number of top-ranked keyword candidates may be selected for the keyword set. Moreover, the keyword set may also be formed using a mutual information criteria. In various embodiments, once the keyword set is created, the keyword set may be associated with the media content. When a user comes across this media content, possibly in response to conducting a search for various content, the keyword set may be presented to the user with the media content. Therefore, the presence of the keyword set may allow the user to determine topics and/or content relating to the media content without actually having to render (e.g., listen to, view, etc.) the media content. As a result, to determine whether a particular media file is relevant to the user, sorting through media files that each include associated keywords relating to the subject matter of the media files may prove to be more efficient than rendering the media files themselves.

FIG. 5 is a flowchart illustrating a process 500 of generating a keyword set based on media content and one or more web documents. In particular, block 502 illustrates creating a transcript for media content. In various embodiments, the transcript may or may not correspond to transcript 314 and the media content may or may not correspond to media content 116 and/or media content 312. Moreover, the creating may be performed by speech recognizer component 118 and/or speech recognizer component 302. As mentioned previously, speech, non-speech, and/or other noise included in the media content may be converted into a transcript that includes text using any speech recognition techniques known in the art (i.e., ASR). Accordingly, the transcript may represent the subject matter of the media content in text form.

Block 504 illustrates generating one or more queries from the transcript. In various embodiments, the generating may be performed by extraction component 118 and/or extraction component 304 and the one or more web queries may correspond to web queries 316, as shown in FIGS. 1 and 3. In particular, the queries may constitute words found in the transcript and/or words that are similar, but not identical, to words occurring in the transcript. Additionally, the queries may also contain phrases identified in the transcript and/or phrases that are similar, but not identical, to phrases occurring in the transcript. Accordingly, the queries may correspond to terms that represent topics and/or subject matter relating to the transcript and/or the media content.

Block 506 illustrates pruning the one or more queries. More particular, once the one or more queries have been identified, the queries may also be pruned to remove words included in the queries, as described in additional detail with respect to FIG. 3. For instance, a particular query may be pruned based on whether a probability assigned to that query falls below a confidence threshold. Once the queries are pruned, duplicative and/or similar queries may be removed.

Block 508 illustrates retrieving web documents corresponding to the one or more queries. In various embodiments, the retrieving may be performed by the search engine component 306 and the web documents may correspond to web documents 218. More particularly, the one or more queries may be issued to a search engine, which may identify and retrieve web documents that are responsive and/or relevant to each of the queries. Moreover, since the queries may have been extracted from the transcript, the web documents may be topically similar, meaning that one or more of the web documents may relate to the same, or similar, subject matter.

Block 510 illustrates parsing keyword candidates from the web documents. The keyword candidates may correspond to keyword candidates 320 and the extracting may be performed by keyword collection component 124 and/or keyword collection component 308. Moreover, the web documents may also be referred to as websites. In some embodiments, once the queries are issued and corresponding web documents are retrieved, keyword candidates may be extracted from the web documents. As stated above, a website may include descriptive information (i.e., meta information) in the header of the website. This information may be included in the header in order to identify topics and/or subject matter described in the website and it also may be used by search engines to determine which websites are relevant to a particular query. Accordingly, the terms included in the meta information of websites may be extracted and designated as keyword candidates. Alternatively, the keyword candidates may be extracted from text or images in the body of a website.

Block 512 illustrates ranking the keyword candidates. In various embodiments, the ranking may be performed by keyword selector component 126 and/or keyword selector component 310. Specifically, the keyword candidates may be ranked based on a mutual information criteria or any other ranking technique known in the art. Moreover, the keyword candidates may be ranked based on their similarity to the media content and/or the transcript. The keyword candidates may also be ranked based at least in part on the frequency of each keyword candidate occurring in the one or more web documents. For instance, a keyword candidate that appears in multiple web documents may be ranked higher than a keyword candidate that occurs in only one web document. Moreover, since the keyword candidates may be identified based on web documents retrieved in response to the queries, the keyword candidates may be terms and/or phrases that do not appear in the transcript or the media content.

Block, 514 illustrates creating a keyword set based on the keyword candidates. In some embodiments, the creating may be performed by keyword selector component 126 and/or keyword selector component 310 and the keyword set may correspond to keyword set 322. Once the keyword candidates have been identified, a certain number of keyword candidates may be selected and included in the keyword set. The keywords included in the keyword set may be selected based on their respective similarity to the media content and/or the transcript derived from the media content. Moreover, the keyword set may be generated based at least in part on a mutual information criteria and, as described above, the keyword set may include keywords in addition to those that appear in the media content and/or the transcript of the media content.

As stated above, the keyword set may include keywords that are representative of topics and/or subject matter relating to the media content. Accordingly, the keyword set may be associated with the media content such that the keyword set is presented to a user with the media content. Since a user may be able to view keywords descriptive of the media content along with the media content, the user may determine a topic and/or subject matter of the media content without actually rendering the media content. For instance, a user may determine whether the media content is relevant or of interest to the user without needing to watch a video file or listen to an audio file. Consequently, associating and presenting the keyword set with the media content may allow a user to skim through multiple media files without needing to render each media file to determine its relevance, which may save a significant amount of time.

In other embodiments, the keyword set may not be presented with its corresponding media content. Rather, the keyword set may initially be hidden from view but then may become visible upon some type of user actuation. For instance, pressing a button or selecting an icon may allow the user to view the keyword set for a particular media file. In addition, the media content may also be indexed based at least in part on the keyword set. Since the media content may now include associated keywords that describe its content, it may be easier to discover and/or search for the media content. Therefore, a user searching for media content via the Internet or a database may locate relevant media content of interest to the user in a more expedient manner.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:
1. A method comprising:
   generating a transcript from media content using automatic speech recognition;
   extracting transcript keyword candidates from the transcript once the transcript is generated from the media content;

determining that a first subset of the extracted transcript keyword candidates relates to a primary topic of the media content and a second subset of the extracted transcript keyword candidates relates to a second topic of the media content, wherein the primary topic is different from the second topic;

generating web queries from the transcript keyword candidates and submitting the web queries to a search engine;

accumulating results from the web queries to form a set of web documents and extracting web document keyword candidates from the set of web documents;

determining mutual information criteria for individual ones of the extracted transcript keyword candidates based at least in part on a number of documents from the set of web documents that contain a co-occurrence of an extracted transcript keyword candidate with a web document keyword candidate, and a total number of documents of the set of web documents;

ranking, based at least in part on the mutual information criteria, the extracted transcript keyword candidates to generate ranked transcript keyword candidates, wherein the first subset of the extracted transcript keyword candidates related to the primary topic of the media content are ranked higher than the second subset of the extracted transcript keyword candidates related to the second topic of the media content;

selecting one or more of the extracted transcript keyword candidates based at least in part on the ranked transcript keyword candidates to form a keyword set; and associating the keyword set with the media content.

2. A method as recited in claim 1, further comprising associating the keyword set with the media content such that the keyword set is presented with the media content, the keyword set including keywords that represent the primary topic and the second topic associated with the media content.

3. A method as recited in claim 1, wherein the keyword set includes one or more other words or phrases in addition to words or phrases included in the transcript.

4. A method as recited in claim 1, further comprising presenting the keyword set to a user before rendering the media content.

5. A method as recited in claim 1, wherein selecting the one or more of the extracted transcript keyword candidates further comprises identifying a predetermined number of top-ranked transcript keyword candidates from the extracted transcript keyword candidates and associating the top-ranked transcript keyword candidates with the media content.

6. A method as recited in claim 1, further comprising indexing the media content based at least in part on the selected one or more extracted transcript keyword candidates included in the keyword set.

7. A method comprising:

generating a transcript from media content using automatic speech recognition;

extracting transcript keyword candidates from the transcript once the transcript is generated from the media content;

generating web queries from the extracted transcript keyword candidates and submitting the web queries to a search engine;

accumulating results from the web queries to form a set of web documents and extracting web document keyword candidates from the set of web documents;

determining mutual information criteria for individual ones of the extracted transcript keyword candidates based at least in part on a number of documents from the set of web documents that contain a co-occurrence of an extracted transcript keyword candidate with an extracted web document keyword candidate, and a total number of documents of the set of web documents;

ranking, based at least in part on the mutual information criteria, the extracted transcript keyword candidates to generate ranked extracted transcript keyword candidates; and selecting one or more of the extracted transcript keyword candidates based at least in part on the ranked extracted transcript keyword candidates to form a keyword set; and associating the keyword set with the media content.

8. A method as recited in claim 7, wherein the media content does not include any associated keywords prior to the transcript keyword candidates being extracted.

9. A method as recited in claim 7, wherein associating the keyword set with the media content comprises presenting the keyword set with the media content, the keyword set including keywords that represent one or more topics associated with the media content.

10. A method as recited in claim 7, wherein ranking the extracted transcript keyword candidates further comprises ranking the extracted transcript keyword candidates based on respective relevance of the extracted transcript keyword candidates with respect to the media content.

11. A method as recited in claim 7, further comprising pruning at least one of the selected one or more transcript keyword candidates from the keyword set based at least in part on whether the at least one of the selected one or more transcript keyword candidates is below a relatedness threshold.

12. A system comprising:

one or more processors;

one or more storage devices storing modules that are executable by the one or more processors, the modules including:

a speech recognizer component that generates a transcript based on speech and non-speech included in media content;

an extraction component that extracts transcript keyword candidates from the transcript once the transcript is generated from the media content by the speech recognizer component;

a keyword collection component that:

accumulates search results from web queries formed from the extracted transcript keyword candidates submitted to a search engine;

forms a set of web documents from the search results; and extracts web document keyword candidates from the set of web documents; and a keyword selector component that:

determines mutual information criteria for individual ones of the extracted transcript keyword candidates based at least in part on a number of documents from the set of web documents that contain a co-occurrence of an extracted transcript keyword candidate with a web document keyword candidate, and a total number of documents of the set of web documents;

ranks the extracted transcript keyword candidates, based at least in part on the mutual information criteria, to form a ranking; and selects one or more of the extracted transcript keyword candidates based at least in part on the ranking to form a keyword set that is to be associated with the media content.

13. A system as recited in claim 12, wherein:

at least the web queries include a phrase including multiple words from the extracted transcript keyword candidates; and the extracted transcript keyword candidates are identified based at least in part on meta information associated with the web documents or text in a body of the web documents.

14. A system as recited in claim 13, wherein the meta information associated with the web documents comprises manually generated keyword lists, and the manually generated keyword lists are used as a constraint for selecting the one or more of the extracted transcript keyword candidates.

\* \* \* \* \*